United States Patent
Dowdy et al.

[11] Patent Number: 5,909,223
[45] Date of Patent: Jun. 1, 1999

[54] TEXT FACE SCALER

[75] Inventors: Thomas E. Dowdy, Sunnyvale; Alexander B. Beaman, Cupertino, both of Calif.

[73] Assignee: Apple Computer, Inc., Cupertino, Calif.

[21] Appl. No.: 08/706,293

[22] Filed: Sep. 4, 1996

[51] Int. Cl.⁶ .................................................. G06F 17/21
[52] U.S. Cl. ............................................................ 345/467
[58] Field of Search .................................. 345/471, 192, 345/467; 365/230.01; 395/110

[56] References Cited

U.S. PATENT DOCUMENTS

| | | | |
|---|---|---|---|
| 4,987,550 | 1/1991 | Leonard et al. | 345/471 |
| 5,041,994 | 8/1991 | Lahey et al. | 395/110 |
| 5,226,116 | 7/1993 | Sasaki | 345/467 |
| 5,235,551 | 8/1993 | Sinofsky et al. | 365/230.01 |
| 5,293,477 | 3/1994 | Matoba | 345/192 |
| 5,526,477 | 6/1996 | McConnell et al. | 345/467 |

OTHER PUBLICATIONS

"QuickDraw GX Typography: Inside Macintosh," (Reading: Addison–Wesley, 1994) pp. 1–10 & 1–11, 1994.

*Primary Examiner*—Joseph H. Feild
*Assistant Examiner*—John L. Young
*Attorney, Agent, or Firm*—Sawyer & Associates

[57] ABSTRACT

A method of providing text faces to a graphics display system in a data processor. The method includes the steps of receiving a request for a text face from a graphics system and determining whether the requested text face has been saved. If the requested text face has been saved, then it is retrieved. If it has not been saved, then it is generated and saved for access by the graphics system. In this manner, a single generation of a text face is necessary. The storage of the generated text face saves the system from having to generate the same text face repeatedly.

17 Claims, 7 Drawing Sheets

TEXT FACE SCALER

FIELD OF THE INVENTION

The present invention relates to graphic generation of text and more particularly, the present invention relates to the generation and storage of text face.

BACKGROUND OF THE INVENTION

Current computer systems provide individuals with an opportunity to produce documents of professional quality, such as with desktop publishing software and graphics software programs. The ability to manipulate the appearance of the text within these programs is vital in allowing users greater flexibility in creativity in document production. Included in these manipulations are changes in fonts, justification, size, and other aspects of the appearance, such as bolding and italicizing. The process of modifying a character is generally referred to as the operation of text face. For instance, to make the character "A" bold, a system may draw the character "A" twice to make it look bold. To make "A" italicized, the outline of the letter "A" may be drawn, stored, reshaped to look italicized, and displayed.

For ease of understanding the subject matter, some definitions are herein presented. What is meant by the term "text" is words of something written or printed. What is meant by Characters are abstract objects having a single and unique semantic or phonetic meaning. Glyphs, as opposed to characters, represent the visual, graphical appearance of a character. The particular representation of a character by a glyph is done in the context of the font, the font being a collection of glyphs which typically have an element of design consistency in their appearance.

Text face data can be represented as a data structure, a stream of bytes that can be interpreted either in binary or text, or executable code. A text face, as used in this specification, is a specific variation in the appearance of a glyph that can be applied consistently to all the glyphs in a font family, which is produced in an algorithmic way. A detailed explanation of text face data structures can be found in *Inside Macintosh: QuickDraw GX, Typography*, by Apple Computer, Inc., Addison-Wesley Publishing Company, 1994. Examples of streams of bytes that can be interpreted either in binary or text are picture op-codes and POST SCRIPT® by Adobe, Inc., respectively.

A problem with the conventional graphics display method and system is that each time a particular text face is desired for a particular character, the graphics system must compute the modification of the character, regardless of whether that particular text face has been requested before. Generating a text face is typically computationally intensive since the required algorithms are processed for every text face of every character for each instance a text face is utilized. Consequently, the graphics display system can be inefficient.

Accordingly, a need exists for a flexible and portable system that allows a single generation of a particular text face for repeated use.

SUMMARY OF THE INVENTION

The present invention allows a single generation of a text face by generating a requested text face and storing the generated text face for future reference.

The present invention includes a method of providing text faces to a graphics display system in a data processor, comprising the steps of receiving a request for a text face from a graphics system and determining whether the requested text face has been saved. If the requested text face has been saved, then it is retrieved. If it has not been saved, then it is generated and saved for access by the graphics system.

The present invention also includes a system of providing text faces in a data processor, comprising means for requesting a text face coupled to a means for generating the requested text face. A means for storing the generated text face is coupled to the generating means and the requesting means. The generating means is also coupled to a means for deriving a font format such that the font format is used by the generating means in generating the requested text face.

DETAILED DESCRIPTION OF THE INVENTION

The present invention relates to the generation and storage of text face. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
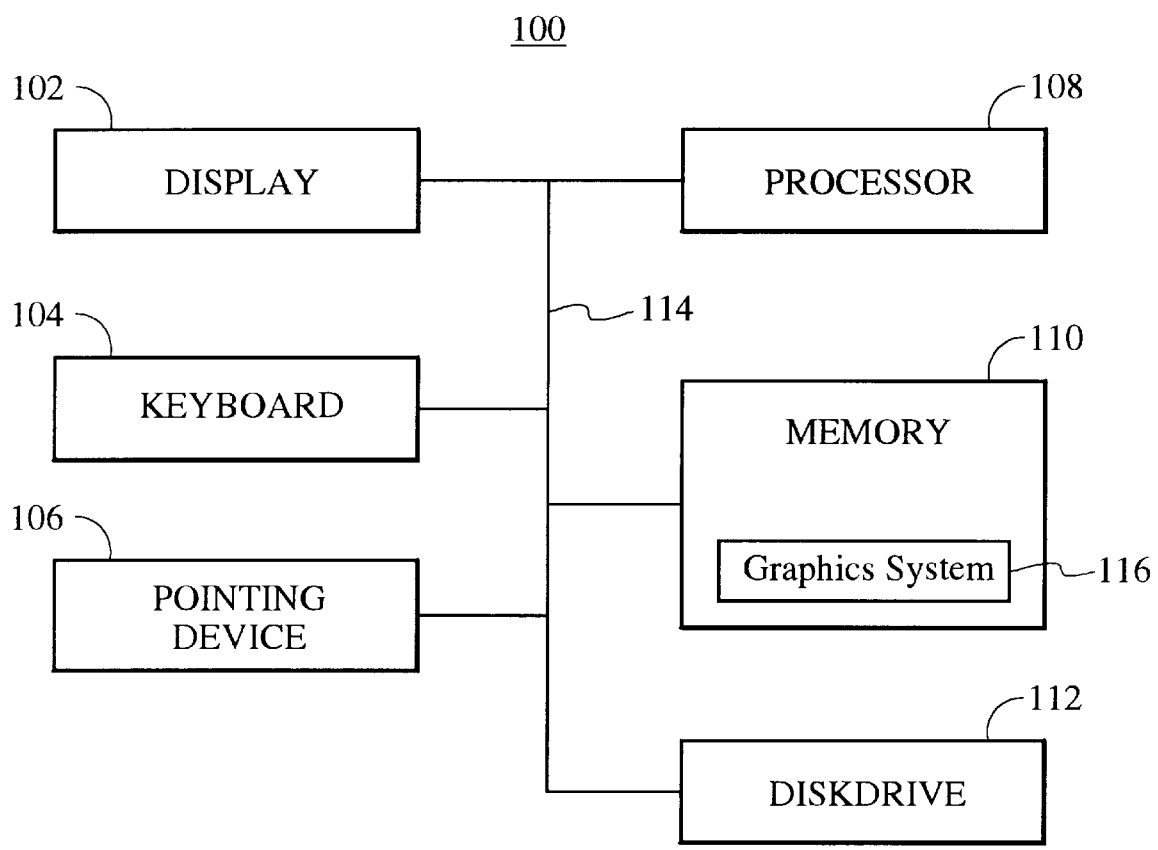
FIG. 1 is a conventional processing system in which the present invention resides.

FIG. 1 is a block diagram illustrating a conventional computer system in which the present invention resides. The computer system 100 includes a display 102, a keyboard 104, a pointing device 106, a processor 108, a memory 110, and a disk drive 112, which are all connected by a bus 114. The graphics system 116 of the present invention will reside in memory 110. The processor 108 operates in conjunction with the memory 110 to execute a graphics system 116 which can recall various font formats more efficiently than the conventional graphics systems. In a preferred embodiment, the graphics system may be loaded onto the computer through the disk drive 112 or through a network connection.

Figure 2:
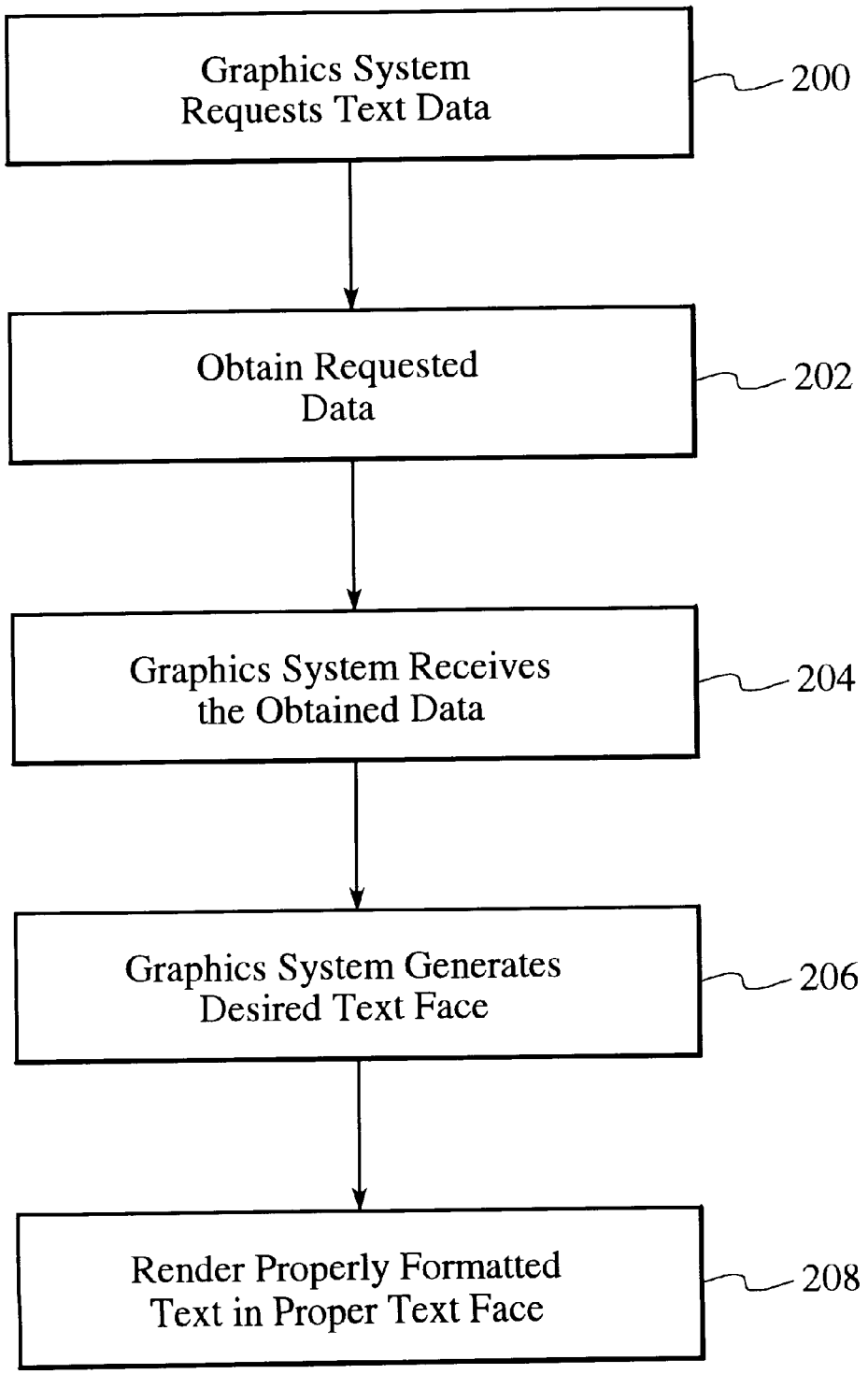
FIG. 2 is a flow diagram of a prior art text data generation and rendering system.

FIG. 2 is a flow diagram illustrating a conventional method of obtaining text information in preparation for rendering text on a screen. The graphics system requests text data via step 200. The data requested by the graphics system is typically the font, the size, the mapping, metrics, bitmaps and outlines. The requested data is obtained via step 202. The graphics system then receives the obtained data via step 204. The graphics system generates any desired text face via step 206. Lastly, the properly formatted text is rendered in proper text face via step 208.

Figure 3:
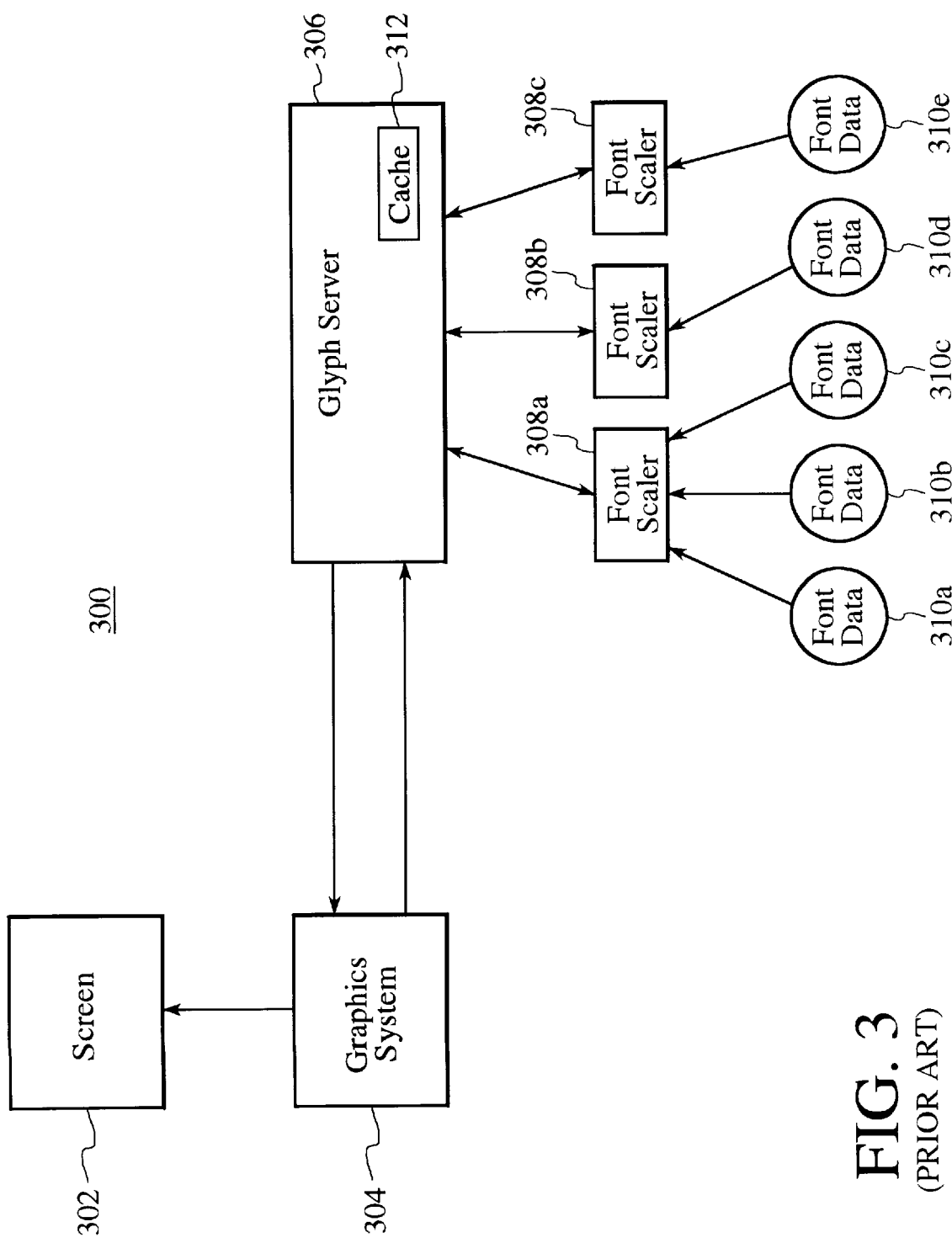
FIG. 3 is a block diagram of a prior art text data generation and rendering system.

FIG. 3 shows a simplified block diagram of a conventional graphics display system 300. It includes a screen 302, a graphics system 304, a glyph server 306, font scalers 308a–308c, and font formats 310a–310e. To render text to the screen 302, the graphics system 304 makes a request for the desired font or glyph from the glyph server 306. Typically, the requests made by the graphics system 304 include information regarding metrics, bitmaps and outlines, font, size and mapping.

The glyph server 306 describes each requested glyph to be generated. A glyph server 306 can be a portable unit that is capable of interfacing with a variety of graphics systems 304. Instead of generating glyph data itself, the graphic system 304 requests glyphs from the glyph server 306, which then services the request. The glyph cache 312 is used by the glyph server 306 to store generated glyphs for high speed access. However, data related to text face is not stored in the glyph cache 312 in the conventional system.

The glyph server 306 makes requests of the font scaler 308 appropriate for the format of the font in use. The font scaler 308 generates the required glyph data such as metrics, bit maps, and outlines and deposits it in the glyph server's cache. The glyph server 306 then caches and forwards the requested glyph data to the graphics system 304. The graphics system 304 then can generate the desired text face and render the text onto the screen 302.

As previously discussed, a problem with the conventional graphics display method and system is that each time a particular text face is desired for a particular character, the graphics system computes the modification of the character, regardless of whether that particular text face has been requested before. Generating a text face is typically computationally intensive since the required algorithms are processed for every text face of every character for each instance a text face is utilized. Consequently, the graphics display system can be inefficient.

The present invention allows a single generation of a text face by generating a requested text face and storing the generated text face for future reference. Unlike the conventional systems, the information regarding the text face is stored and used within the font scaler rather than within the graphics system. This improved method of generating the text face has the advantage of allowing the generated text faces to participate in glyph caching. Once a text face is cached, access to the text face is much faster than it would be through a conventional method.

Figure 6:
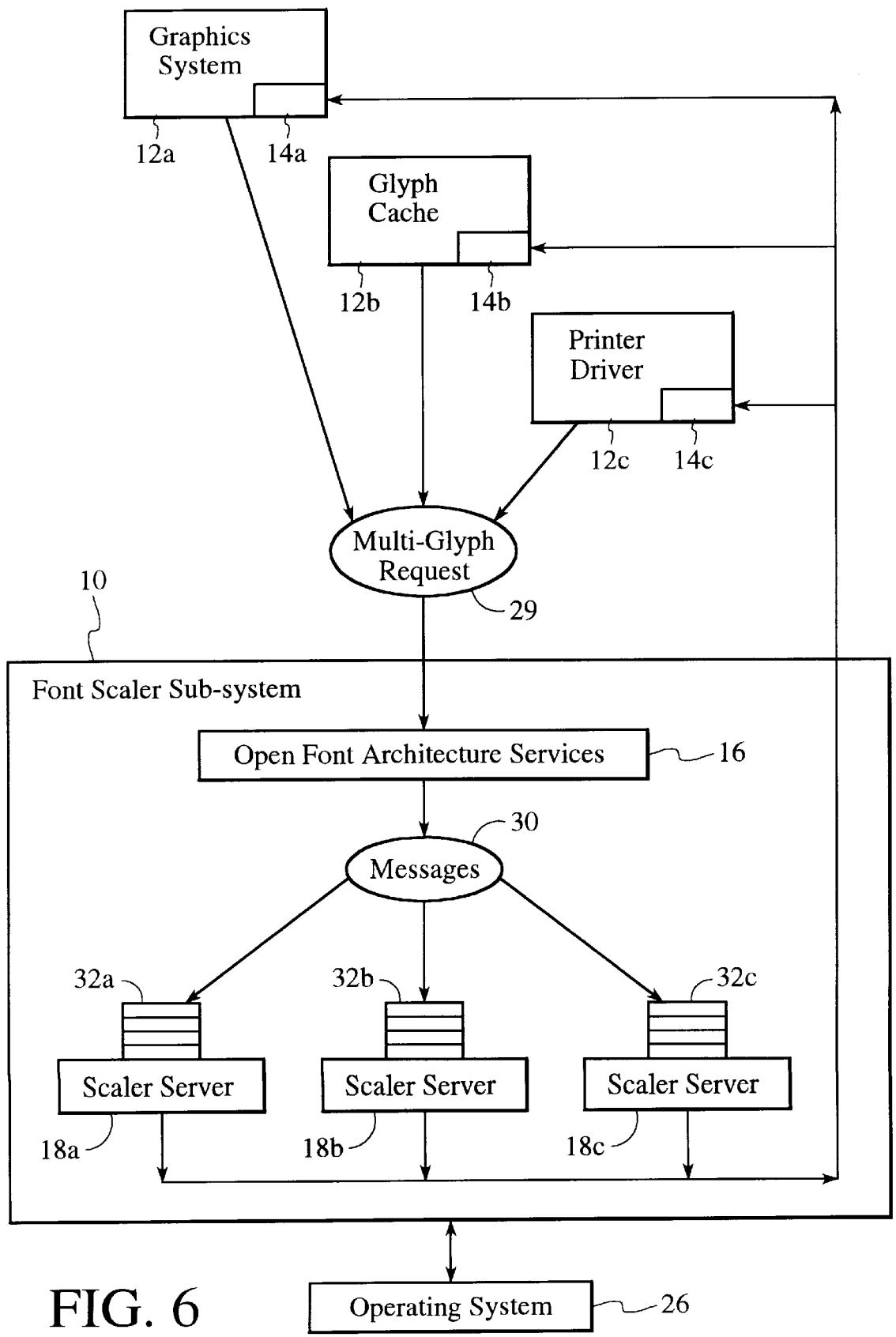
FIG. 6 is a block diagram illustrating components of a font scaler sub-system in accordance with the present invention.

FIG. 6 is a block diagram illustrating components of a font scaler sub-system 10 in accordance with the present invention. The font scaler sub-system 10 includes an open font architecture services unit 16, and one or more scaler servers 18a, 18b, and 18c.

The open font architecture services unit 16 is an application program interface (API) that allows various clients 12a, 12b and 12c of the font scaler sub-system 10 to send multi-glyph requests 29 to the scaler servers 18 for glyph generation. Clients of the font scaler sub-system 10 may includes a graphics system 12a, such as QuickDraw GX, for example, and a printer driver 12c. The graphics system 12a may request that the glyphs be stored in graphics memory 14a, and the printer driver 12c may specify that the requested glyphs be transmitted to a buffer, where it will then be sent to the printer memory 14c. Another example of a client of the font scaler sub-system 10 is a glyph cache 12b, which is a component of a glyph server (not shown). The glyph cache 12b may request that the glyph data be stored in the memory 14b of the glyph cache 12b.

Figure 7:
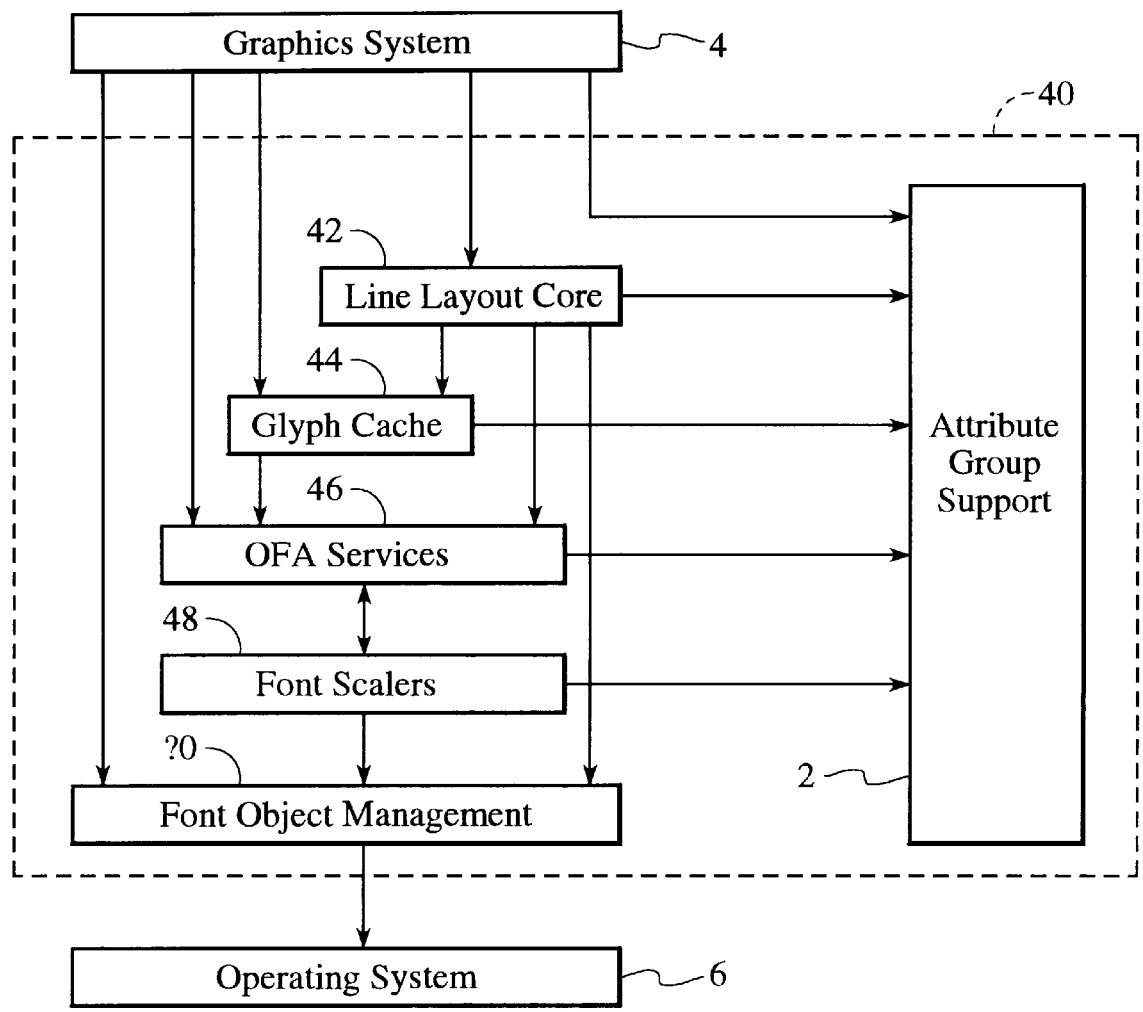
FIG. 7 is a block diagram illustrating components of a glyph server in accordance with the present invention.

A block diagram illustrating components of a glyph server 40 in accordance with the present invention is presented in FIG. 7. Included in the glyph server 40 are line layout core unit 42, glyph cache unit 44, open font architecture (OFA) services unit 46, one or more font scalers 48, a font object management unit 50, and an attribute group support unit 52.

As shown in FIG. 7, the glyph server 40 interacts between a graphics system 54 running on a computer system. The graphics system 54 from whom the text data is received by the glyph server 40 suitably interacts with five of the glyph server 40 components through API (application program interface) calls, as is well appreciated by those skilled in the art.

The font object management unit 50 is responsible for several functions, including knowing where the fonts are in the operating system 56, caching pieces of font file data for rapid reissue, and handling the requests for font file data itself. Further the font object management unit 50 capably performs these functions transparently to the rest of the glyph server 40 components.

Interpreting the proprietary or font format specific data within each font file provided from the font object management unit 50 is suitably handled by the font scalers 48. The appropriate font scalers 48 are preferably dispatched by the OFA services unit 46. The OFA services unit 46 provides a mechanism that permits support of multiple font file formats and provides an interface for the glyph cache unit 44 to the font scales supporting the font file formats. The glyph cache unit 44 suitably handles multiple requests at a time and manages the memory to store as much glyph data as possible.

Figure 4:
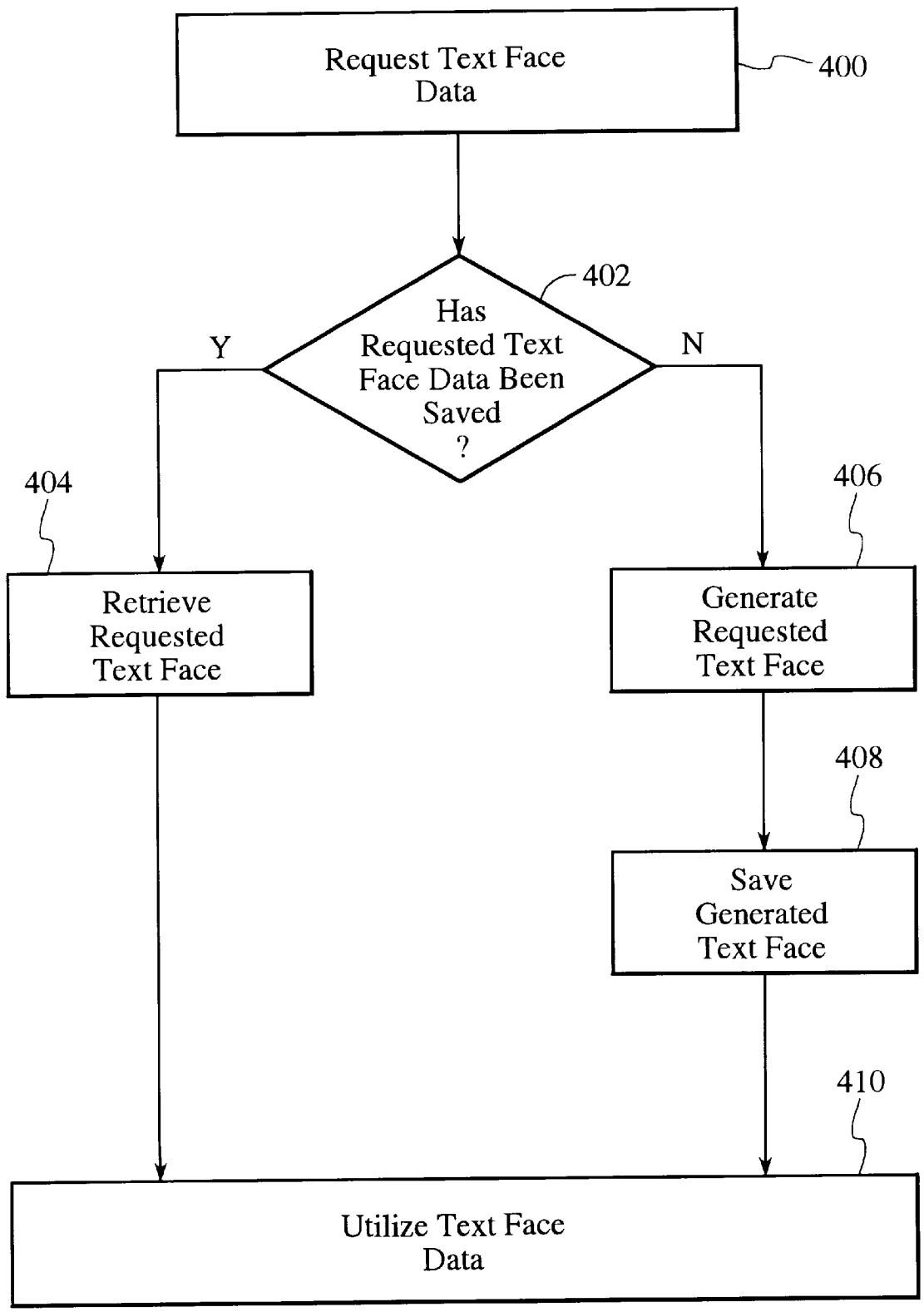
FIG. 4 is a flow diagram of a text face generation and rendering system according to the present invention.

FIG. 4 shows a flow diagram of a method according to the present invention. In addition to the graphics system 504 of FIG. 5 requesting the standard text data requests of the conventional system, text face data is also requested via step 400. The text face data can include such items as a data structure, a stream of bytes that can be interpreted either in binary or text, and executable code. Examples of a data structure of a text face include bolding and outlining. A detailed explanation of text face data structure can be found in Inside Macintosh: QuickDraw GX, Typography, by Apple Computer, Inc., Addison-Wesley Publishing Company, 1994. Examples of a stream of bytes that can be interpreted either in binary or text are op-codes and POST SCRIPT, respectively.

It is then determined whether the requested text face data has been saved via step 402. If the data has been saved then the requested text face is retrieved via step 404. Then the system may utilize the text face data via step 410. If the requested text face data has not been saved, then the requested text face is generated via step 406. The generated text face is then saved via step 408 and utilized via step 410.

Figure 5:
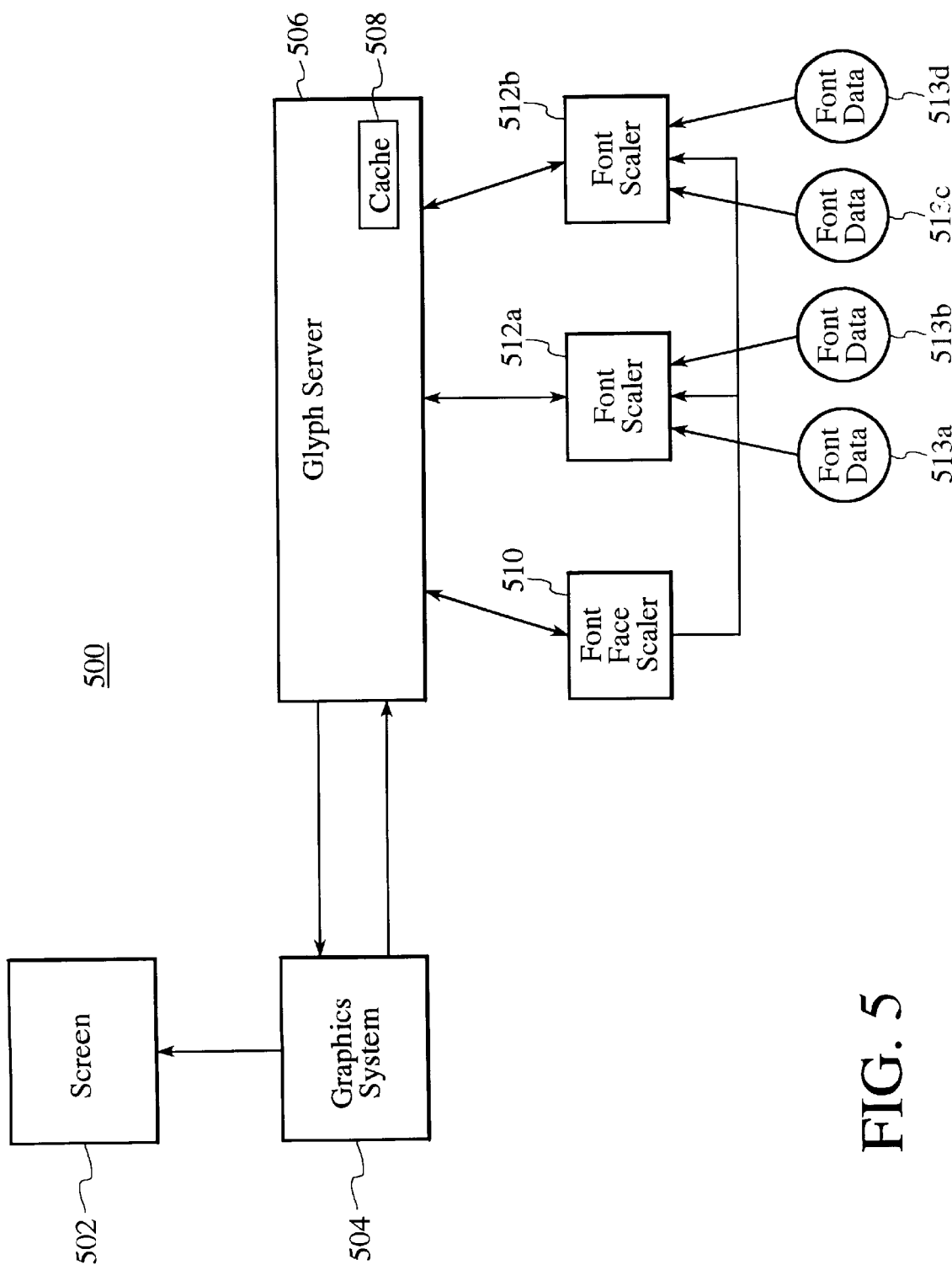
FIG. 5 is a block diagram of a text face generation and rendering system according to the present invention.

FIG. 5 shows a block diagram of a text face generating system 500 with the glyph server shown in accordance with the present invention. The system 500 includes a screen 502, a graphics system 504, a glyph server 506, with a cache 508, a text face scaler 510, and one or more text face scalers 512a–512b. When a text face is desired, the graphics system 504 makes a request of the glyph server 506. If the requested text face data is stored in cache 508, it will relay that information to the graphics system 504. If, however, the requested text face data is not stored in cache 508, the glyph server requests the information from the text face scaler 510.

In contrast to the conventional graphics display system shown in FIG. 3, the text face is not generated in the graphics system 504. Instead, the text face is generated by the text face scaler 510 which facilitates the storage and retrieval of the generated text face for future reference.

The text face scaler 510 utilizes the appropriate font scaler 512 which supports the font format of the font in use 513*a*–513*d*. A font scaler 512 can support one or more font formats 513*a*–513*d* and can be used to compute the glyph data according to that format. The desired data can be computed in the font scaler 512 and the results accessed by the text face scaler 510. The text face scaler 510 uses these results to generate the requested text face by using the appropriate algorithm. The text face scaler 510 then deposits the text face in the glyph server's cache.

The glyph server 506 can then send the generated text face to the graphics system 504 which can render the text face onto the screen 502. The text face generated by the text face scaler 510 can be stored in the cache 508 for future reference. This storage of the generated text face saves the system from having to generate the same text face repeatedly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing text faces to a graphics display system in a data processor, comprising the steps of:

(a) receiving by a glyph server a request for a text face from a graphics system, wherein the glyph server interfaces between the graphics system and a text face scaler;

(b) determining whether the requested text face has been saved;

(c) retrieving the requested text face from a glyph server cache if the requested text face has been saved;

(d) generating the requested text face if the requested text has not been saved wherein the requested text face is generated in the text face scaler, wherein the text face scaler is interfaced between the glyph server and font data; and (e) saving the generated text face in the glyph server cache for access by the graphics system.

2. The method of claim 1, further comprising step (d1) of accessing font data for use in generating the requested text face.

3. The method of claim 2, wherein the font data is accessed through a font scaler.

4. The method of claim 1, wherein the request for a text face includes the data structure of the text face.

5. The method of claim 1, wherein the request for a text face includes a stream of bytes that can be interpreted as binary code.

6. The method of claim 1, wherein the request for a text face includes a stream of bytes that can be interpreted as text.

7. The method of claim 1, wherein the request for a text face includes executable code.

8. A system for providing text faces in a data processor, comprising:

means for requesting a text face from a glyph server;

means for generating the requested text face coupled between the glyph server and font data;

means for storing the generated text face coupled to the generating means and the glyph server; and means for deriving font data coupled to the generating means in which the derived font data is used by the generating means in generating the requested text face.

9. A system of providing text faces in a data processor, comprising:

a graphics system capable of requesting a text face from a glyph server, wherein the glyph server interfaces between the graphics system and a text face scaler;

a text face scaler for generating the requested text face, the text face scaler being coupled between the glyph server and font data;

a glyph server cache for storing the generated text face, the glyph server cache being coupled to the glyph server and the text face scaler; and a font scaler for processing font data, the font scaler coupled to the text face scaler in which the processed font data is used by the text face scaler in generating the requested text face.

10. A computer-readable medium containing program instructions for providing text faces to a graphics display system in a data processor, comprising the steps of:

(a) receiving by a glyph server a request for a text face from a graphics system, wherein the glyph server interfaces between the graphics system and a text face scaler;

(b) determining whether the requested text face has been saved;

(c) retrieving the requested text face from a glyph server cache if the requested text has been saved;

(d) generating the requested text face if the requested text has not been saved wherein the requested text face is generated in a text face scaler, wherein the text face scaler is interfaced between the glyph server and font data; and (e) saving the generated text face in the glyph server cache for access by the graphics system.

11. The computer-readable medium containing program instructions for claim 10, further comprising step (d1) of accessing font data for use in generating the requested text face.

12. The computer-readable medium containing program instructions for claim 10, further comprising step (a1) wherein the request for a text face is received by the glyph server that describes the text face that is to be generated.

13. The computer-readable medium containing program instructions for claim 10, wherein the font data is accessed through a font scaler.

14. The computer-readable medium containing program instructions for claim 10, wherein the request for a text face includes the data structure of the text face.

15. The computer-readable medium containing program instructions for claim 10, wherein the request for a text face includes a stream of bytes that can be interpreted as binary code.

16. The computer-readable medium containing program instructions for claim 10, wherein the request for a text face includes a stream of bytes that can be interpreted as text.

17. The computer-readable medium containing program instructions for claim 10, wherein the request for a text face includes executable code.

\* \* \* \* \*